(12) United States Patent
Abel et al.

(10) Patent No.: US 10,371,091 B2
(45) Date of Patent: Aug. 6, 2019

(54) ELECTRIC THRUST REVERSER ACTUATION SYSTEM WITH CONTROLLED BRAKE ASSIST

(71) Applicant: HONEYWELL INTERNATIONAL INC., Morris Plains, NJ (US)

(72) Inventors: Steve Abel, Chandler, AZ (US); James Wawrzynek, Phoenix, AZ (US); Patrick Hinke, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 382 days.

(21) Appl. No.: 15/384,979

(22) Filed: Jan. 9, 2017

(65) Prior Publication Data
US 2018/0195464 A1    Jul. 12, 2018

(51) Int. Cl.
| | | |
|---|---|---|
| *F02K 1/76* | (2006.01) | |
| *F02K 1/72* | (2006.01) | |
| *F02K 1/56* | (2006.01) | |
| *H02P 3/14* | (2006.01) | |
| *H02P 3/22* | (2006.01) | |

(52) U.S. Cl.
CPC .............. *F02K 1/763* (2013.01); *F02K 1/566* (2013.01); *F02K 1/72* (2013.01); *H02P 3/14* (2013.01); *H02P 3/22* (2013.01); *F05D 2270/62* (2013.01); *Y02T 50/671* (2013.01)

(58) Field of Classification Search
CPC .......... F02K 1/763; F02K 1/766; F02K 1/566; F02K 1/625; F02K 1/72; F05D 2270/62; F05D 2220/764; H02P 3/14; H02P 3/22
See application file for complete search history.

(56) References Cited

U.S. PATENT DOCUMENTS

| | | | |
|---|---|---|---|
| 6,684,623 B2 | 2/2004 | Langston et al. | |
| 2006/0101806 A1* | 5/2006 | Ahrendt | F02K 1/72 |
| | | | 60/226.2 |
| 2012/0013278 A1* | 1/2012 | Hanlon | H02P 3/18 |
| | | | 318/379 |
| 2012/0118683 A1 | 5/2012 | Desbois-Renaudin et al. | |
| 2015/0097499 A1* | 4/2015 | Maalioune | F02K 1/763 |
| | | | 318/369 |

* cited by examiner

*Primary Examiner* — Andrew H Nguyen
(74) *Attorney, Agent, or Firm* — Lorenz & Kopf, LLP (57) ABSTRACT

A thrust reverser control system includes a plurality of actuators, an electric motor, an electric brake, and a control. Each actuator is responsive to an actuator input torque to move between a stowed position and a deployed position. The electric motor is coupled to each of the actuators and is configured, upon being energized from a voltage source having a supply voltage magnitude, to supply the actuator input torque to the actuators and further configured to selectively generate regenerative current. The electric brake is coupled to be selectively supplied with the regenerative current and is configured, upon being supplied with the regenerative current, to supply a braking torque that slows movement of the actuators. The control is coupled to the electric brake and is configured, upon the supply voltage magnitude exceeding a predetermined value, to cause the regenerative current to be supplied to the electric brake.

20 Claims, 6 Drawing Sheets

FIG. 10

ELECTRIC THRUST REVERSER ACTUATION SYSTEM WITH CONTROLLED BRAKE ASSIST

TECHNICAL FIELD

The present invention generally relates to dynamic braking of electric motors, and more particularly relates to a system and method for providing brake assist in an electric thrust reverser actuation system without using a parasitic or aiding load resistor.

BACKGROUND

When turbine-powered aircraft land, the wheel brakes and the imposed aerodynamic drag loads (e.g., flaps, spoilers, etc.) of the aircraft may not be sufficient to achieve the desired stopping distance. Thus, the engines on most turbine-powered aircraft include thrust reversers. Thrust reversers enhance the stopping power of the aircraft by redirecting the engine exhaust airflow, via various moveable thrust reverser components, in order to generate reverse thrust. When stowed, the moveable thrust reverser components typically form a portion of the engine nacelle and forward thrust nozzle. When deployed, the moveable thrust reverser components typically redirect at least a portion of the airflow (from the fan and/or engine exhaust) forward and radially outward, to help decelerate the aircraft.

Various thrust reverser designs are commonly known, and the particular design utilized depends, at least in part, on the engine manufacturer, the engine configuration, and the propulsion technology being used. Thrust reverser designs used most prominently with turbofan engines fall into two general categories: (1) fan flow thrust reversers, and (2) mixed flow thrust reversers. Fan flow thrust reversers affect only the bypass airflow discharged from the engine fan. Whereas, mixed flow thrust reversers affect both the fan airflow and the airflow discharged from the engine core (core airflow).

Fan flow thrust reversers are typically used on relatively high-bypass ratio turbofan engines. Fan flow thrust reversers include so-called "Cascade-type" or "Translating Cowl-type" thrust reversers. Fan flow thrust reversers are generally positioned circumferentially around the engine core aft of the engine fan and, when deployed, redirect fan bypass airflow through a plurality of cascade vanes disposed within an aperture of a reverse flow path. Typically, the moveable thrust reverser components of a fan flow thrust reverser designs include one or more translating sleeves or cowls ("transcowls") that, when deployed, open an aperture, expose cascade vanes, and create a reverse flow path. Fan flow reversers may also include so-called pivot doors or blocker doors which, when deployed, rotate to block the forward thrust flow path.

In contrast, mixed flow thrust reversers are typically used with relatively low-bypass ratio turbofan engines. Mixed flow thrust reversers typically include so-called "Target-type," "Bucket-type," and "Clamshell Door-type" thrust reversers. The moveable thrust reverser components of these types of thrust reversers typically include two or more pivoting doors that rotate, simultaneously opening a reverse flow path through an aperture and blocking the forward thrust flow path. However, a transcowl type thrust reverser could also be configured for use in a mixed flow application. Regardless of type, mixed flow thrust reversers are necessarily located aft or downstream of the engine fan and core, and often form the aft part of the engine nacelle.

The moveable thrust reverser components in each of the above-described designs are moved between the stowed and deployed positions by a thrust reverser actuation control system. The thrust reverser actuation control system may include a power drive unit (PDU), which selectively supplies a drive torque. A drive train that includes one or more drive mechanisms, such as flexible rotating shafts, may interconnect the PDU to a plurality of actuators to transmit the PDU's drive torque to the actuators, which are coupled to the moveable thrust reverser components.

The PDU in many thrust reverser actuation control systems is being implemented using an electric motor. As may be appreciated, a thrust reverser PDU, when deploying the thrust reverser movable components, preferably accelerates the actuators and associated movable components as quickly as possible, and then very quickly brings the actuators and movable components to a stop. Near the end of a deploy operation, the aerodynamic load typically becomes an overhauling load, which would tend to accelerate the actuators and the electric motor. Thus, near the end of a deploy operation, the electric motor is typically configured as an electromagnetic brake to slow the actuators down.

When electrical braking of an electric machine, such as the electric motor in a thrust reverser actuation system, is required and electrical power cannot be directed back to the power source, a parasitic load resistor (PLR) or aiding load resistor (ALR) is generally provided. The PLR or ALR, which may be passively or actively controlled, is an undesirable heat source that is typically located in the thrust reverser actuation control system controller. The PLR or ALR also undesirably increases system weight.

Hence, there is a need for a system and method of dissipating electric power during electric motor braking in a thrust reverser control system, while simultaneously reducing the weight of the thrust reverser control system and simplifying the electronic controls. The present invention addresses one or more of these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a thrust reverser control system includes a plurality of actuators, an electric motor, an electric brake, and a control. Each actuator is coupled to receive an actuator input torque and is configured, upon receipt of the actuator input torque, to move between a stowed position and a deployed position. The electric motor is coupled to each of the actuators. The electric motor is adapted to be selectively energized from a voltage source having a supply voltage magnitude and is configured, upon being energized, to supply the actuator input torque to the actuators and further configured to selectively generate regenerative current. The electric brake is coupled to be selectively supplied with the regenerative current and is configured, upon being supplied with the regenerative current, to supply a braking torque that slows movement of the actuators. The control is coupled to the electric brake and is configured, upon the supply voltage magnitude exceeding a predetermined value, to cause the regenerative current to be supplied to the electric brake.

In another embodiment, a thrust reverser control system includes a plurality of moveable thrust reverser components, a plurality of actuators, an electric motor, an electric brake, and a control. The moveable thrust reverser components are movable between a stowed position and a deployed position. The actuators are coupled to the moveable thrust reverser components. Each actuator is coupled to receive an actuator input torque and is configured, upon receipt of the actuator input torque, to move the moveable thrust reverser components between the stowed and deployed positions. The electric motor is coupled to each of the actuators. The electric motor is adapted to be selectively energized from a voltage source having a supply voltage magnitude and is configured, upon being energized, to supply the actuator input torque to the actuators and further configured to selectively generate regenerative current. The electric brake is coupled to be selectively supplied with the regenerative current and is configured, upon being supplied with the regenerative current, to supply a braking torque that slows movement of the actuators. The control is coupled to the electric brake and is configured, upon the supply voltage magnitude exceeding a predetermined value, to cause the regenerative current to be supplied to the electric brake.

In yet another embodiment, the thrust reverser control system includes a plurality of moveable thrust reverser components, a plurality of actuators, an electric motor, an electric brake, a brake switch, and a control. The moveable thrust reverser components are movable between a stowed position and a deployed position. The actuators are coupled to the moveable thrust reverser components. Each actuator is coupled to receive an actuator input torque and is configured, upon receipt of the actuator input torque, to move the moveable thrust reverser components between the stowed and deployed positions. The electric motor is coupled to each of the actuators. The electric motor is adapted to be selectively energized from a voltage source having a supply voltage magnitude and is configured, upon being energized, to supply the actuator input torque to the actuators and further configured to selectively generate regenerative current. The electric brake is coupled to be selectively supplied with the regenerative current and is configured, upon being supplied with the regenerative current, to supply a braking torque that slows movement of the actuators. The brake switch is responsive to a brake switch control signal to transition between an OFF state, in which the electric brake cannot receive the regenerative current, and an ON state, in which the electric brake can receive the regenerative current. The control is coupled to the brake switch and is configured, upon the supply voltage magnitude exceeding a predetermined value, to supply the brake switch control signal, to thereby cause the regenerative current to be supplied to the electric brake.

Furthermore, other desirable features and characteristics of the dynamic motor braking control system and method will become apparent from the subsequent detailed description and the appended claims, taken in conjunction with the accompanying drawings and the preceding background.

BRIEF DESCRIPTION OF THE DRAWINGS

Various embodiments of the present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description. Thus, although the description is explicitly directed toward an embodiment that is implemented in a thrust reverser system in which transcowls and doors are used as the moveable thrust reverser components, it should be appreciated that it can be implemented in other thrust reverser actuation system designs, including those described above and those known now or hereafter in the art. It should additionally be appreciated that it can be implemented in numerous and varied other systems in which regenerative motor braking is desired, and not just in thrust reverser control systems.

Figure 1:
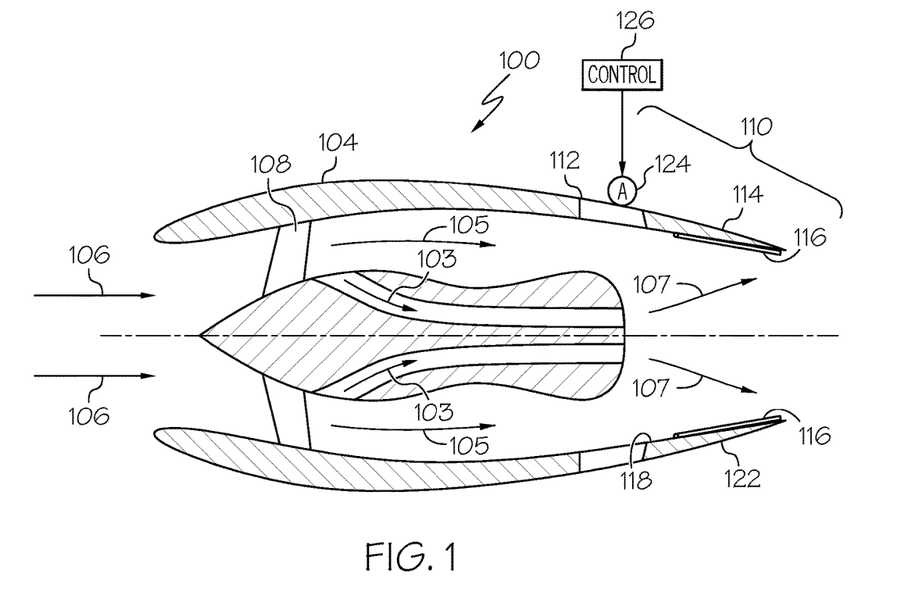
FIGS. 1 and 2 depict a turbofan engine equipped with a mixed flow thrust reverser system, and with the thrust reverser system in a stowed position and deployed position, respectively.
Figure 2:
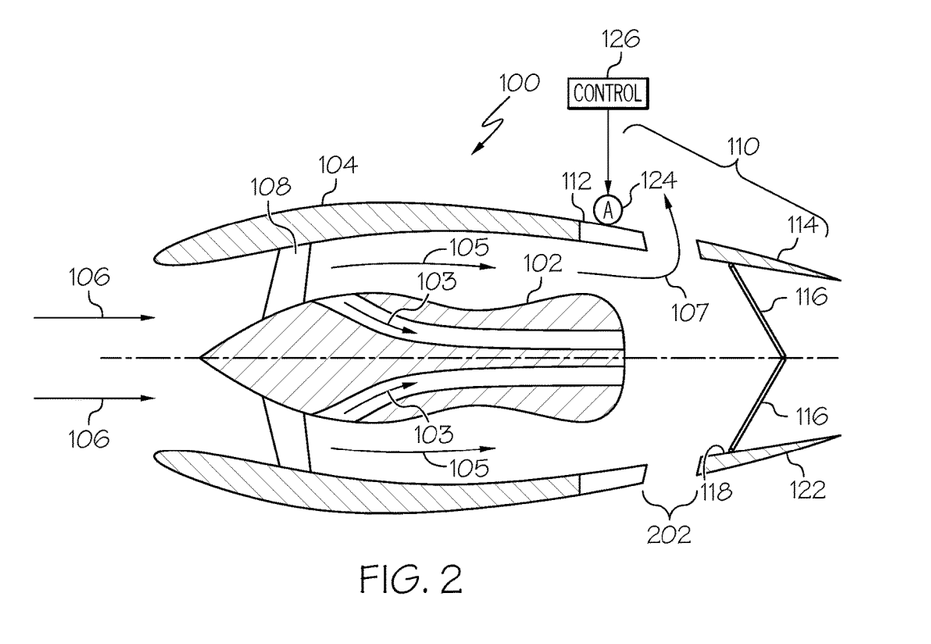

Referring first to FIGS. 1 and 2, the turbofan engine 100 includes a gas turbine engine 102 that is encased within an aerodynamically smooth outer covering, generally referred to as the nacelle 104. Ambient air 106 is drawn into the nacelle 104 via a rotationally mounted fan 108 to thereby supply engine airflow. A portion of the engine airflow is drawn into the gas turbine engine 102, where it is pressurized, and mixed with fuel and ignited, to generate hot gasses known as core flow 103. The remainder of engine airflow bypasses the gas turbine engine 102 and is known as fan flow 105. The core flow 103 and the fan flow 105 mix downstream of the gas turbine engine 102 to become the engine exhaust flow 107, which is discharged from the turbofan engine 100 to generate forward thrust.

The nacelle 104 comprises a mixed flow thrust reverser system 110. The thrust reverser system 110 includes a support structure 112 and one or more movable thrust reverser components. In the depicted embodiment, the system 110 includes a plurality of movable thrust reverser components—an annular translatable cowl 114, or transcowl, and one or more doors 116 (two in the depicted embodiment). The transcowl 114 is mounted on the support structure 112 and has an inner surface 118 and an outer surface 122. The transcowl 114 is axially translatable, relative to the support structure 112, between a stowed position, which is the position depicted in FIG. 1, and a deployed position, which is the position depicted in FIG. 2. In the stowed position, the transcowl 114 is disposed adjacent the support structure 112. In the deployed position, the transcowl 114 is displaced from the support structure 112 by a second distance to form a reverse thrust aperture 202 (see FIG. 2).

Each of the one or more doors 116 is rotatable between a first position, which is the position depicted in FIG. 1, and a second position, which is the position depicted in FIG. 2. More specifically, each door 116 is rotatable between the first position and the second position, when the transcowl 114 translates between the stowed position and the deployed position, respectively. As is generally known, each door 116 is configured, when it is in the second position, to redirect at least a portion of the engine airflow through the reverse thrust aperture 202 to thereby generate reverse thrust. In particular, at least a portion of the engine exhaust flow 107 (e.g., mixed core flow 103 and fan flow 105) is redirected through the reverse thrust aperture 202.

Figure 3:
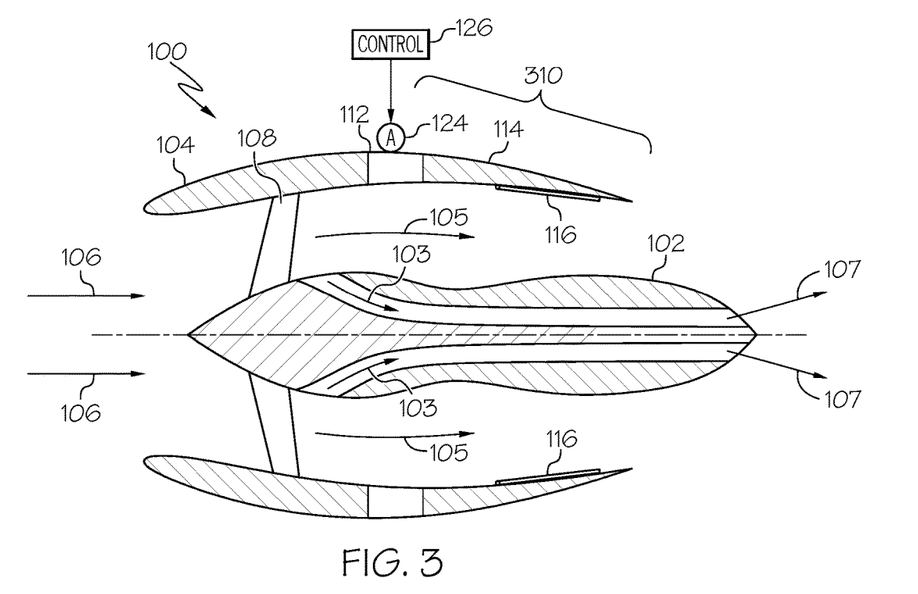
FIGS. 3 and 4 depict a turbofan engine equipped with a fan flow thrust reverser system, and with the thrust reverser system in a stowed position and deployed position, respectively.
Figure 4:
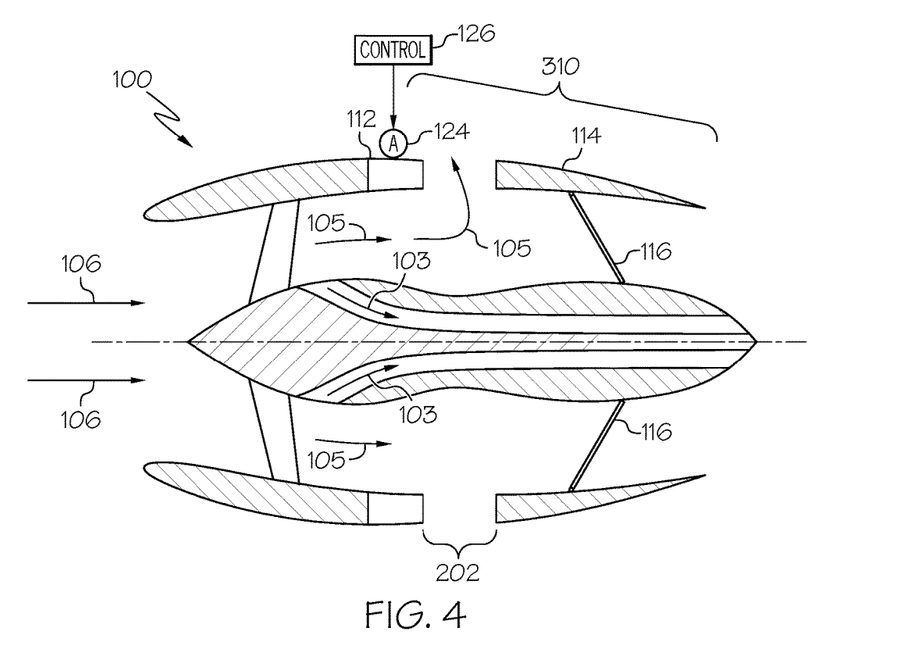

Referring now to FIGS. 3 and 4, the turbofan engine 100 equipped with a fan flow thrust reverser system 310 will be briefly described. Before doing so, however, it is noted that like reference numerals in FIGS. 1-4 refer to like parts, and that descriptions of the like parts of the depicted turbofan engines 100 will not be repeated. The notable difference between the turbofan engine 100 depicted in FIGS. 3 and 4 is that the fan flow thrust reverser system 310 is disposed further upstream than that of the mixed flow thrust reverser system 110 depicted in FIGS. 1 and 2.

As with the mixed flow thrust reverser system 110, the depicted fan flow thrust reverser system 310 includes the support structure 112 and, as the moveable thrust reverser components, the transcowl 114, and the one or more doors 116 (again, two in the depicted embodiment). Moreover, each door 116 is rotatable between a first position, which is the position depicted in FIG. 3, and a second position, which is the position depicted in FIG. 4. Similarly, each door 116 is rotatable between the first position and the second position, when the transcowl 114 translates between the stowed position and the deployed position, respectively. As is generally known, each door 116 is configured, when it is in the second position, to redirect at least a portion of the engine airflow through the reverse thrust aperture 202 to thereby generate reverse thrust. In this case, however, only fan bypass flow 105 is redirected through the reverse thrust aperture 202.

As FIGS. 1-4 also depict, the thrust reverser systems 110, 310 additionally include a plurality of actuators. Each actuator 124 is coupled to the support structure 112 and the movable thrust reverser components 114, 116, and is configured to supply an actuation force to the movable thrust reverser components 114, 116. More specifically, each actuator 124 is responsive to commands supplied from a control 126 to supply an actuation force to the movable thrust reverser components 114, 116, to thereby move the movable thrust reverser components 114, 116 between the stowed position and the deployed position. It will be appreciated that the actuators 124 may be implemented using any one of numerous types of actuators. In the depicted embodiment, each is implemented using linear screw-type actuator that includes an alternate reverse thrust load path.

Figure 5:
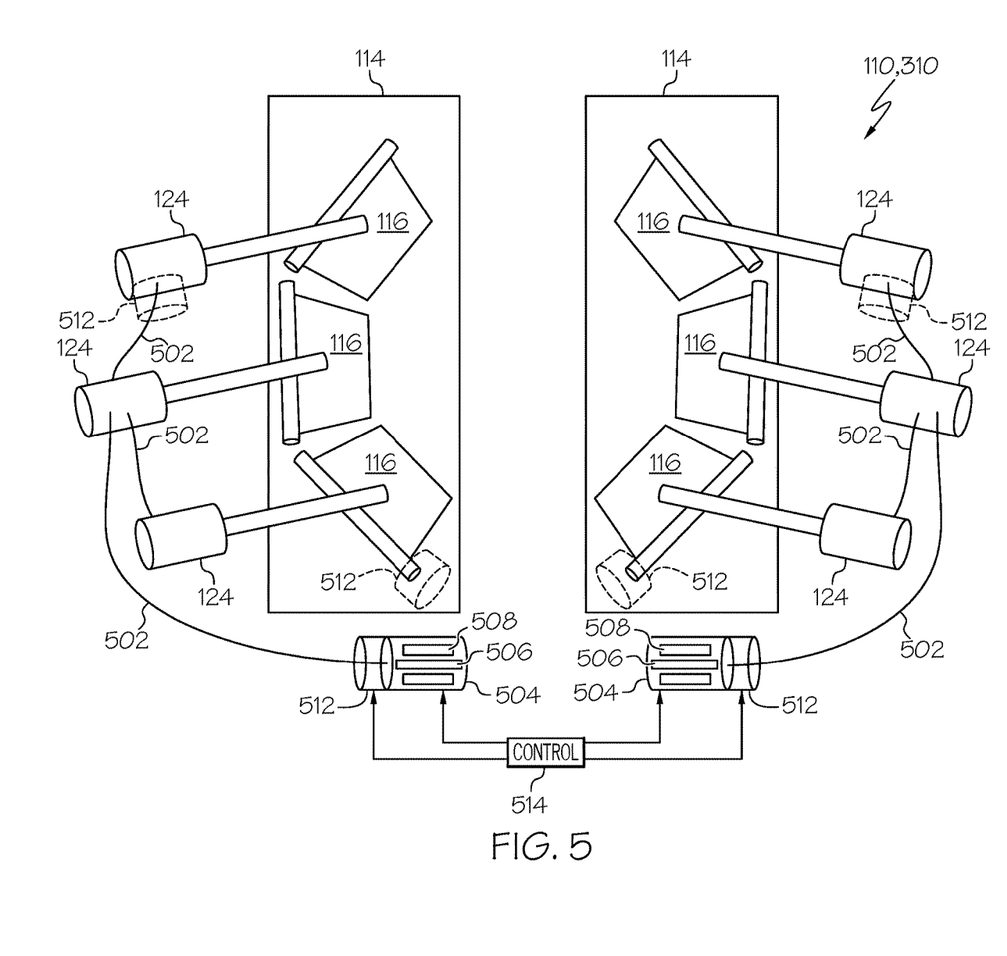
FIG. 5 depicts a functional schematic representation of an actuation control system that may be used in the embodiments of FIGS. 1-4.

As shown more clearly in FIG. 5, the actuators 124 are individually coupled (either directly or indirectly) to the movable thrust reverser components 114, 116. In the depicted embodiment, half of the actuators 124 are coupled to half of the movable thrust reverser components 114, 116, and the other half of the actuators 124 are coupled to the other half of the movable thrust reverser components 114, 116. Though not depicted, it will be appreciated that some of the actuators 124 may include locks, and that the transcowls 114 also may each include locks. It is noted that the actuators 124 may be any one of numerous actuator designs presently known in the art or hereafter designed. However, in this embodiment the actuators 124 are ballscrew actuators. It is additionally noted that the number and arrangement of actuators 124 is not limited to what is depicted in FIG. 5, but could include other numbers of actuators 124 as well.

The actuators 124 associated with each half of the movable thrust reverser components 114, 116 are interconnected via a plurality of drive mechanisms 502, each of which, in the particular depicted embodiment, comprises a flexible shaft. The flexible shafts 502 ensure that the actuators 124, and thus all the moveable thrust reverser components 114, 116, move in a substantially synchronized manner. Other drive or synchronization mechanisms that may be used include electrical synchronization or open loop synchronization, or any other mechanism or design that transfers power between the actuators 124.

An electric motor 504 is coupled to one of the actuators 124 associated with each half of the movable thrust reverser components 114, 116. Although the depicted embodiment uses two motors 504, one associated with each half of the movable thrust reverser components 114, 116, in other embodiments only a single motor 504 with dual outputs may be used. Moreover, although the electric motors 504 in the depicted embodiment are coupled to the associated actuators 124 via flexible shafts 502, in other embodiments the motors 504 could be directly coupled to the associated actuators 124. It will additionally be appreciated that the systems 110, 310 may be implemented with more than the number of depicted motors 504, as required to meet the specific design requirements of a particular thrust reverser system.

The motors 504 may be implemented using any one of the various DC or AC motor designs known in the art. In the depicted embodiment, however, each motor 502 is implemented as a multi-phase motor 504, and more particularly as a 3-phase electric motor. In this regard, the multi-phase motor 504 preferably includes a rotor 506 and a multi-phase stator 508. The rotor 506 is rotationally mounted and is at least partially surrounded by the multi-phase stator 508. The multi-phase stator 508 is configured, upon being energized, to cause the rotor 506 to rotate and supply the drive torque to the actuators 124.

The systems 110, 310 additionally include one or more electric brakes 512. In the depicted embodiment, the systems 110, 310 include two electric brakes 512—one each associated with each half of the movable thrust reverser components 114, 116. It will be appreciated that the systems 110, 310 could include more or less than this number of electric brakes 512. Moreover, as FIG. 5 further depicts, in some embodiments each electric brake 512 is coupled to one of the electric motors 504, and in other embodiments (depicted using dotted lines) each electric brake 512 may be coupled to one of the actuators 124 or to one of the moveable thrust reverser components 114, 116 (e.g., one of the doors). Regardless of which component each electric brake 512 is coupled to, each electric brake 512 is coupled to be selectively supplied with regenerative current that is supplied from the electric motor 504, and is configured, upon being supplied with the regenerative current, to supply a braking torque that slows movement of its associated actuators 124.

The thrust reverser systems 110, 310 also preferably include a control 514. The control 514 receives commands from a non-illustrated engine control system such as, for example, a FADEC (full authority digital engine control), and receives various signals from a plurality of sensors. In response to these signals, the control 514 selectively energizes the electric motors 504. In turn, the motors 504 supply the drive torque to the actuators 124 via the flexible shafts 502. The control 514 also controls the supply of the above-mentioned regenerative current to the electric brakes 512. The manner in which the control 514 is configured to implement these functions will now be described in more detail.

Figure 6:
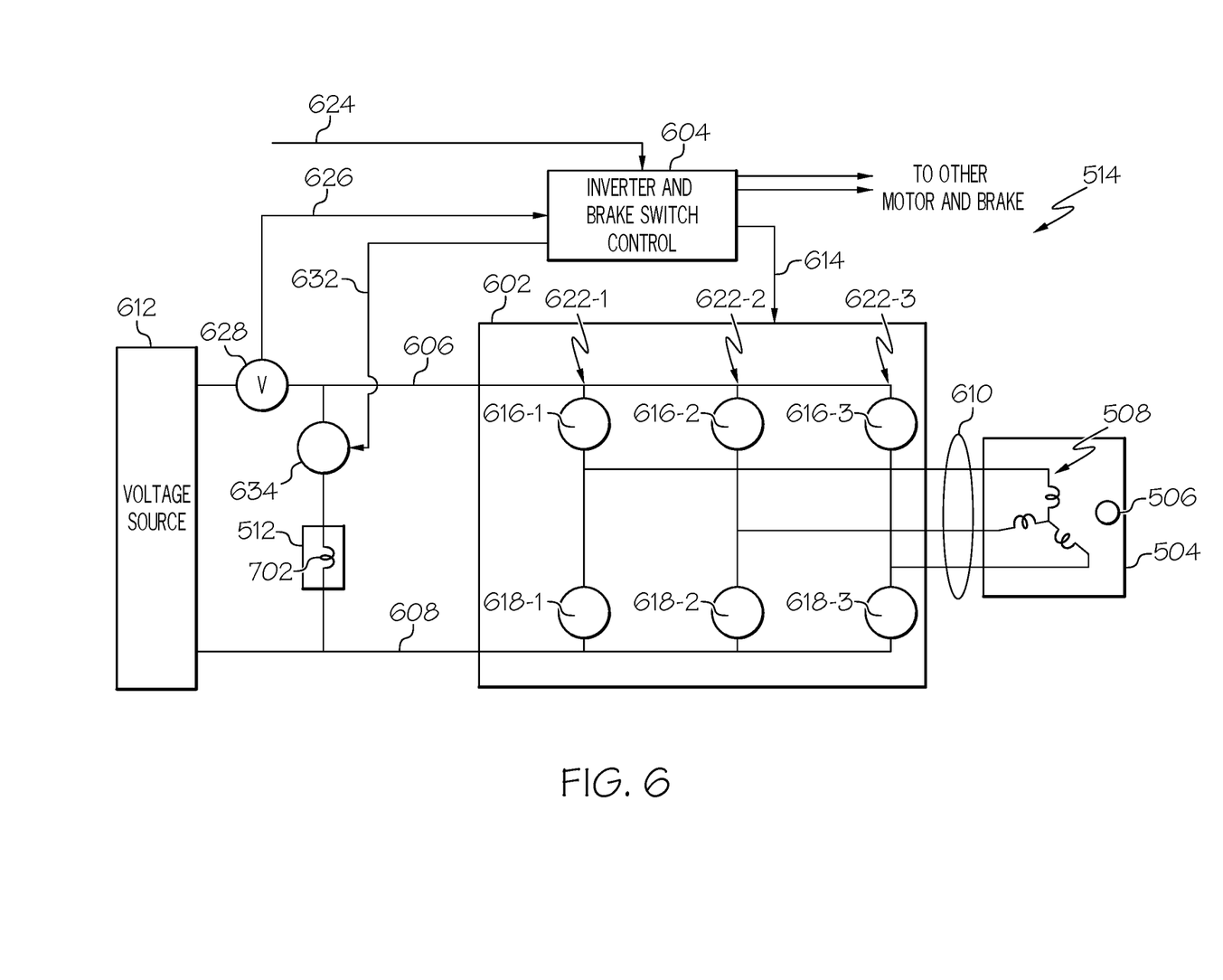
FIG. 6 depicts a schematic representation of a portion of the control of FIG. 5, and its interconnections.

Referring now to FIG. 6, a schematic representation of a portion of the control 514 and its interconnection with the motors 504 is depicted, and includes at least a multi-phase inverter 602 and a inverter and brake switch control 604. The inverter 602 includes a first DC input 606, a second DC input 608, and a plurality of AC outputs 610. The first and second DC inputs 606, 608 are coupled to a voltage source 612. The voltage source 612 is connected to, and is configured to supply a DC voltage and current to, the inverter 602. The voltage source 612 may be any one of numerous DC voltage sources. Some non-limiting examples include one or more generators, one or more fuel cells, one or more batteries (such as lead acid, nickel metal hydride, or lithium ion batteries), one or more ultra-capacitors, one or more passively or actively controlled AC-to-DC rectifiers, or a voltage bus coupled to one or more (or other) of these sources.

The inverter 602 is also coupled to receive inverter control signals 614 from the inverter and brake switch control 604. The inverter 602 is configured, in response the inverter control signals 614, to operate the motor 504 in either a motoring mode or a regenerative (e.g, braking) mode. In the motoring mode, the inverter 602 selectively converts DC current supplied from the voltage source 612 to AC current, and supplies the AC current, via the plurality of AC outputs 610, to the motor 504. In the regenerative mode, the inverter 602 selectively converts regenerative AC currents generated and supplied by the motor 504 to regenerative DC current, and supplies the regenerative DC current back to the voltage source 612. As will be described further below, a portion of the regenerative DC current is selectively supplied to the brake 512.

The inverter 602 may be implemented using any one of numerous multi-phase inverter configurations, but in the depicted embodiment it is implemented using a conventional 3-phase inverter configuration. As such, the depicted inverter 602 includes a plurality of high-side switches 616 (616-1, 616-2, 616-3), and a plurality of low-side switches 618 (618-1, 618-2, 618-3). Though not depicted, the inverter 602 may also include a plurality of freewheeling diodes. Each phase 622 (622-1, 622-2, 622-3) of the inverter 602 includes a high-side switch 616 and a low-side switch 618 that are electrically connected in series. As is generally known, each high-side switch 616 and each low-side switch 618 is responsive to inverter control signals 614 supplied thereto from the inverter control 604 to switch between an ON state and an OFF state. In the ON state, current may flow through the high-side and low-side switches 616, 618, and in the OFF state, current may not flow through the high-side and low-side switches 616, 618. It is noted that, for the sake of clarity, individual inverter control signals 614 from the inverter and brake switch control 604 to each high-side and low-side switch 616, 618 are not depicted in FIG. 3. Though not explicitly depicted, it will be appreciated that the high-side and low-side switches 616, 618 may be implemented using insulated gate bipolar transistors (IGBT), MOS transistors, or any one of numerous other suitable switching devices now known, or developed in the future.

The inverter and brake switch control 604 is coupled to the inverter 602, and is adapted to receive a command signal 624 and a voltage magnitude signal 626. The command signal is representative of at least a commanded motor torque, and the voltage signal 626 is representative of supply voltage magnitude. The command signal 624 may be supplied from the above-mentioned engine control system (e.g., a FADEC) or some other non-illustrated system or circuit, and the voltage magnitude signal 626 is supplied from, for example, a voltage sensor 628 that is configured to sense the voltage magnitude of the voltage source 612. The voltage sensor 628 may be implemented using any one of numerous voltage sensors now known or developed in the future. Although only one voltage sensor 628 is depicted, it will be appreciated that more than one of these sensors 628 may be used.

The inverter and brake switch control 604 is configured, in response to the command signal 624 and the voltage magnitude signal 626, to supply inverter control signals 614 to the inverter 602 that cause the multi-phase motor 208 to operate in either the motoring mode or the regenerative mode, and to selectively energize the electric brake 512. More specifically, the inverter and brake switch control 604 is configured, in response to these signals 624, 626, to determine if the magnitude of the supply voltage exceeds a predetermined threshold magnitude. If not, then the inverter control signals 614 supplied to the inverter 602 cause the motors 508 to operate in the motoring mode. If the magnitude of the supply voltage exceeds a predetermined threshold magnitude, this indicates that deceleration or overhauling loads are present. This means that the motors 508 are operating in the regenerative mode and supplying regenerative current, and that at least a portion of the regenerative current should be controllably supplied to the electric brake 512.

To controllably supply regenerative current to the electric brake 512, the inverter and brake switch control 602 is also configured to selectively supply a brake switch control signal 632 to a brake switch 634. Similar to the high-side low-side switches 616, 618, the brake switch 634 is responsive to the brake switch control signal to switch between an OFF state and an ON state. In in the OFF state, current does not flow through the brake switch 634. However, in the ON state, current may flow through the brake switch 634, and energize the electric brake 512. In this manner, energy is drained from DC bus 606, thereby reducing voltage to the nominal and expected level. Though not explicitly depicted, it will be appreciated that the brake switch 634 may be implemented using insulated gate bipolar transistors (IGBT), MOS transistors, or any one of numerous other suitable switching devices now known, or developed in the future.

Figure 7:
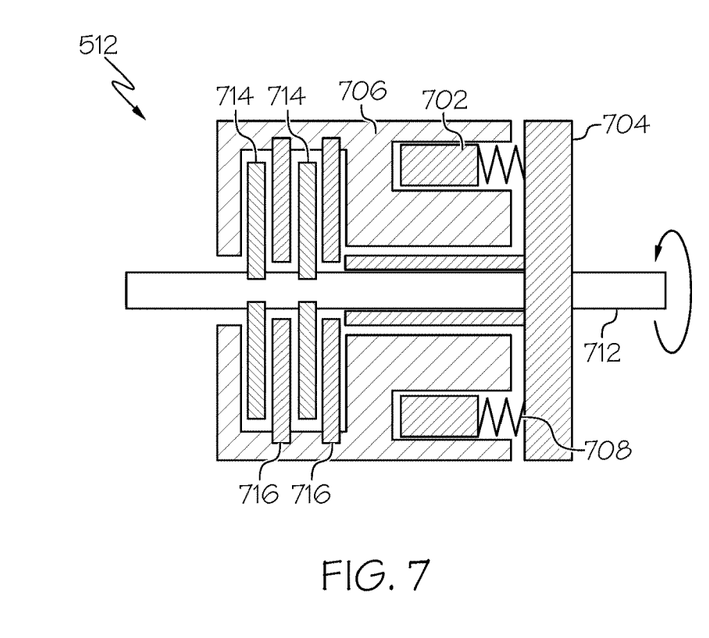
FIGS. 7 and 8 depict simplified cross section views of an electric brake that may be used in the system of FIG. 6.
Figure 8:
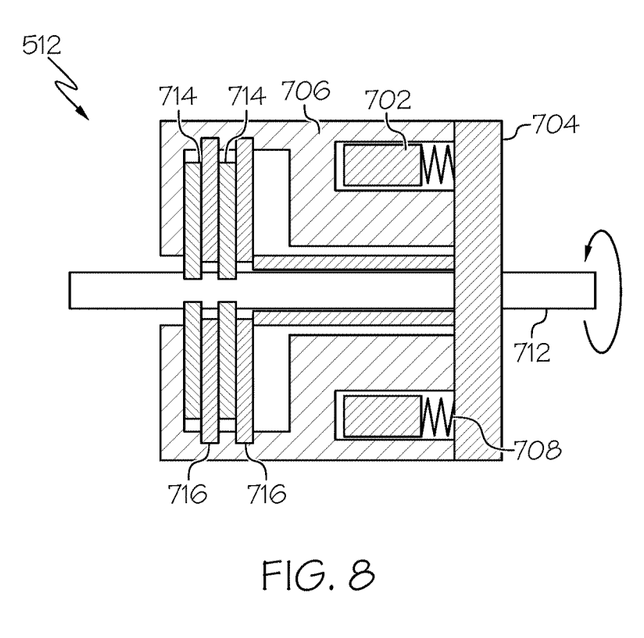

For completeness, and with reference now to FIGS. 7 and 8, one embodiment of an electric brake 512 is depicted and will be described. Each electric brake 512 includes a solenoid coil 702, a rotor (or armature) 704, a stator 706, and one or more return springs 708. When the solenoid coil 702 is energized, as depicted in FIG. 8, the rotor 704, which is coupled to a shaft 712, translates, against the force supplied by the one or more return springs 708, toward the stator 706. A plurality of rotor plates 714 that are coupled to the shaft 712 engage stator plates 716 that are coupled to the stator 706, and supplies a braking torque.

Preferably, the brakes 512 are configured such that the braking torque each supplies is proportional to the magnitude of the regenerative current supplied from its respective motor 504, in order to make the braking torque readily controllable. Thus, as may be appreciated, motor and brake torque will increase together, but with the brakes 512 taking on most of the burden. In addition, the return springs 708 are preferably configured such that braking torque from the brakes 512 does not commence until the magnitude of the regenerative current exceeds a predetermined value. Doing so will extend the life of the brakes.

Figure 9:
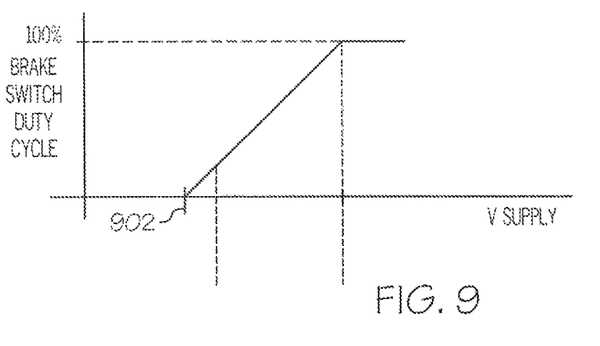
FIGS. 9 and 10 graphically depict functional characteristics associated with the braking function implemented by the brake of FIGS. 7 and 8.
Figure 10:
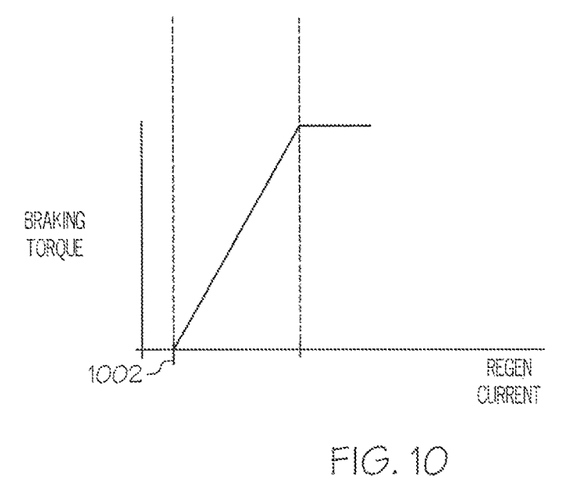

The above-described functional characteristics of the brakes 512 are graphically depicted in FIGS. 9 and 10. In particular, FIG. 9 depicts that the duty cycle of the brake switch 634 increases linearly with the magnitude of the supply voltage, once the magnitude exceeds the predetermined value 902. As may be appreciated, the magnitude of the current supplied to the brake 512, and more specifically the solenoid 702, varies proportionally with the duty cycle. However, as noted above, and as FIG. 10 depicts, due to the configuration of the return springs 708, the braking torque does not begin until the magnitude of the regenerative current exceeds a predetermined value 1002.

It should be noted that the brakes 512 are preferably disposed and configured to operate at relatively high speed (e.g., 5,000-15,000 rpm). By doing so, the rotors can be relatively small and light weight. Moreover, because the braking event is relatively short, the heat produced by mechanically stopping the transcowls 114 is manageable, as is the electrical heat dissipated in the solenoid coil 702.

As noted above, each brake 512 can be located at the high speed input to each actuator 124, at the motor output 504, or on a moveable thrust reverser component 114, 116. For the moveable thrust reverser component 114, 116, a gear box may be used to increase the speed of the brake 512. If located at the gear boxes, flex drive and motor size can be reduced. If located at the blocker door, linear drive, gearbox, flex drive and motor size can all be reduced.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A thrust reverser control system, comprising:
   a plurality of actuators, each actuator coupled to receive an actuator input torque and configured, upon receipt of the actuator input torque, to move between a stowed position and a deployed position;
an electric motor coupled to each of the actuators, the electric motor adapted to be selectively energized from a voltage source having a supply voltage magnitude and configured, upon being energized, to supply the actuator input torque to the actuators and further configured to selectively generate regenerative current;
an electric brake coupled to be selectively supplied with the regenerative current and configured, upon being supplied with the regenerative current, to supply a braking torque that slows movement of the actuators; and
a control coupled to the electric brake and configured, upon the supply voltage magnitude exceeding a predetermined value, to cause the regenerative current to be supplied to the electric brake.

2. The system of claim 1, further comprising:
a brake switch configured to controllably transition between an OFF state, in which the electric brake cannot receive the regenerative current, and an ON state, in which the electric brake can receive the regenerative current.

3. The system of claim 2, wherein:
the brake switch is responsive to a brake switch control signal to transition between the OFF state and the ON state; and
the control is further configured, upon the supply voltage magnitude exceeding the predetermined value, to supply the brake switch control signal.

4. The system of claim 3, wherein the control is further configured to (i) supply the brake switch control signal with a duty cycle and (ii) vary the duty cycle of the brake switch linearly with the supply voltage magnitude, whereby the braking torque supplied by the electric brake varies linearly with the supply voltage magnitude.

5. The system of claim 1, wherein the electric brake comprises:
a stator;
a coil wound on a portion of the stator and coupled to be selectively supplied with the regenerative current;
a rotor disposed adjacent to the stator and configured, in response to the coil being supplied with the regenerative current, to translate toward the stator and supply the braking torque.

6. The system of claim 5, wherein the electric brake further comprises:
one or more return springs engaging the rotor and configured to supply a spring force thereto such that the braking torque does not commence until the magnitude of the regenerative current exceeds a predetermined value.

7. The system of claim 1, wherein the electric brake is coupled to the electric motor.

8. The system of claim 1, wherein the electric brake is coupled to one of the actuators.

9. The system of claim 1, wherein:
the system further comprises one or more moveable thrust reverser components coupled to the actuators; and
the electric brake is coupled to the one or more moveable thrust reverser components.

10. A thrust reverser control system, comprising:
a plurality of moveable thrust reverser components movable between a stowed position and a deployed position;
a plurality of actuators coupled to the moveable thrust reverser components, each actuator coupled to receive an actuator input torque and configured, upon receipt of the actuator input torque, to move the moveable thrust reverser components between the stowed and deployed positions;
an electric motor coupled to each of the actuators, the electric motor adapted to be selectively energized from a voltage source having a supply voltage magnitude and configured, upon being energized, to supply the actuator input torque to the actuators and further configured to selectively generate regenerative current;
an electric brake coupled to be selectively supplied with the regenerative current and configured, upon being supplied with the regenerative current, to supply a braking torque that slows movement of the actuators; and
a control coupled to the electric brake and configured, upon the supply voltage magnitude exceeding a predetermined value, to cause the regenerative current to be supplied to the electric brake.

11. The system of claim 10, further comprising:
a brake switch configured to controllably transition between an OFF state, in which the electric brake cannot receive the regenerative current, and an ON state, in which the electric brake can receive the regenerative current.

12. The system of claim 11, wherein:
the brake switch is responsive to a brake switch control signal to transition between the OFF state and the ON state; and
the control is further configured, upon the supply voltage magnitude exceeding the predetermined value, to supply the brake switch control signal.

13. The system of claim 12, wherein the control is further configured to (i) supply the brake switch control signal with a duty cycle and (ii) vary the duty cycle of the brake switch linearly with the supply voltage magnitude, whereby the braking torque supplied by the electric brake varies linearly with the supply voltage magnitude.

14. The system of claim 10, wherein the electric brake comprises:
a stator;
a coil wound on a portion of the stator and coupled to be selectively supplied with the regenerative current;
a rotor disposed adjacent to the stator and configured, in response to the coil being supplied with the regenerative current, to translate toward the stator and supply the braking torque.

15. The system of claim 14, wherein the electric brake further comprises:
one or more return springs engaging the rotor and configured to supply a spring force thereto such that the braking torque does not commence until the magnitude of the regenerative current exceeds a predetermined value.

16. The system of claim 10, wherein the electric brake is coupled to the electric motor.

17. The system of claim 10, wherein the electric brake is coupled to one of the actuators.

18. The system of claim 10, wherein the electric brake is coupled to the one or more moveable thrust reverser components.

19. A thrust reverser control system, comprising:
a plurality of moveable thrust reverser components movable between a stowed position and a deployed position;
a plurality of actuators coupled to the moveable thrust reverser components, each actuator coupled to receive an actuator input torque and configured, upon receipt of the actuator input torque, to move the moveable thrust reverser components between the stowed and deployed positions;

an electric motor coupled to each of the actuators, the electric motor adapted to be selectively energized from a voltage source having a supply voltage magnitude and configured, upon being energized, to supply the actuator input torque to the actuators and further configured to selectively generate regenerative current;

an electric brake coupled to be selectively supplied with the regenerative current and configured, upon being supplied with the regenerative current, to supply a braking torque that slows movement of the actuators;

a brake switch, responsive to a brake switch control signal, to transition between an OFF state, in which the electric brake cannot receive the regenerative current, and an ON state, in which the electric brake can receive the regenerative current; and a control coupled to the brake switch and configured, upon the supply voltage magnitude exceeding a predetermined value, to supply the brake switch control signal, to thereby cause the regenerative current to be supplied to the electric brake.

20. The system of claim 19, wherein the control is further configured to (i) supply the brake switch control signal with a duty cycle and (ii) vary the duty cycle of the brake switch linearly with the supply voltage magnitude, whereby the braking torque supplied by the electric brake varies linearly with the supply voltage magnitude.

* * * * *